(12) United States Patent
Shah et al.

(10) Patent No.: US 11,023,565 B2
(45) Date of Patent: Jun. 1, 2021

(54) SYSTEM AND PROTOCOL FOR INTEGRATING MULTIPLE SERVICE PROVIDERS ACROSS VARIOUS DOMAINS USING A PLATFORM

(71) Applicant: TATA CONSULTANCY SERVICES LIMITED, Lucknow (IN)

(72) Inventors: Viral Prakash Shah, Mumbai (IN); Gaurav Tandon, Lucknow (IN); Mohit Shukla, Lucknow (IN); Jai Shanker, Mumbai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 271 days.

(21) Appl. No.: 15/935,535

(22) Filed: Mar. 26, 2018

(65) Prior Publication Data
US 2019/0220574 A1   Jul. 18, 2019

(30) Foreign Application Priority Data

Jan. 12, 2018  (IN) .............................. 201821001416

(51) Int. Cl.
| | | |
|---|---|---|
| *G06F 21/10* | (2013.01) | |
| *G06F 16/958* | (2019.01) | |
| *H04L 29/08* | (2006.01) | |
| *H04L 29/06* | (2006.01) | |

(Continued)

(52) U.S. Cl.
CPC ............ *G06F 21/105* (2013.01); *G06F 9/547* (2013.01); *G06F 16/958* (2019.01); *G06F 21/41* (2013.01); *H04L 67/02* (2013.01); *H04L 67/16* (2013.01); *H04L 67/2823* (2013.01);

(Continued)

(58) Field of Classification Search
CPC ...... G06F 21/105; G06F 16/958; G06F 21/41; G06F 9/547; G06F 2221/0717; H04L 67/02; H04L 67/2838; H04L 69/08
See application file for complete search history.

(56) References Cited

U.S. PATENT DOCUMENTS

| | | | |
|---|---|---|---|
| 6,041,362 | A | 3/2000 | Mears et al. |
| 7,017,140 | B2 | 3/2006 | Haji-Aghajani et al. |
| 8,335,792 | B2 | 12/2012 | Britton et al. |

(Continued)

*Primary Examiner* — Lynn D Feild
*Assistant Examiner* — Vladimir I Gavrilenko
(74) *Attorney, Agent, or Firm* — Finnegan, Henderson, Farabow, Garrett & Dunner, LLP

(57) ABSTRACT

A system and protocol for integrating a plurality of service providers across a plurality of domains with an application using a hosted platform have been described. The system involves registration of metadata corresponding to the service providers, their services, their types and their set of parameters. When a new integrating application is provided, then it also includes a wrapper protocol. The wrapper protocol includes six predefined methods. The hosted platform in turn can execute the request of the "integrating application" by internally connecting with the plurality of service providers across a plurality of domains and provide the output in a standard format. Since the wrapper protocol standardizes the format of communication (input & output), hence it reduces effort substantially at the end of the integrating application. The ability of the platform to increase the list of service providers is augmented as it relies on metadata for request generation and invocation.

11 Claims, 4 Drawing Sheets

(51) Int. Cl.
*G06F 9/54* (2006.01)
*G06F 21/41* (2013.01)

(52) U.S. Cl.
CPC .......... *H04L 67/2838* (2013.01); *H04L 69/08* (2013.01); *G06F 2221/0717* (2013.01)

(56) References Cited

U.S. PATENT DOCUMENTS

| | | |
|---|---|---|
| 8,832,252 B2 | 9/2014 | Marin et al. |
| 9,495,226 B2 | 11/2016 | Fernandez |
| 2010/0299438 A1* | 11/2010 | Zimmerman .... H04N 21/43615 709/226 |
| 2014/0201838 A1* | 7/2014 | Varsanyi ............... G06F 21/552 726/23 |
| 2016/0225059 A1* | 8/2016 | Chow .................... G06F 40/169 |
| 2019/0268244 A1* | 8/2019 | Blakeman ............. G06F 3/0481 |

* cited by examiner

SYSTEM AND PROTOCOL FOR INTEGRATING MULTIPLE SERVICE PROVIDERS ACROSS VARIOUS DOMAINS USING A PLATFORM

This U.S. patent application claims priority under 35 U.S.C. § 119 to: India Application No. 201821001416, filed on 12 Jan., 2018. The entire contents of the aforementioned application are incorporated herein by reference.

TECHNICAL FIELD

The embodiments herein generally relates to the field of integration of multiple vendors on a common platform, and, more particularly, to a system and protocol for integrating a plurality of service providers offering multiple services across various domains using the common platform.

BACKGROUND

The rapid evolution of information technology in last couple of decades have resulted in the multiple fold of increase in the online service providers and their products. The corporations have also become largely dependent on the use of these products. There are various products which are more relevant to the organizations such as products related to learning management systems, plagiarism detection, communication, video etc. It would be hugely beneficial to the organizations if there is a single platform or framework which can allow the use and access of these products at one place. It is well-known that software can be used to allow integration of these products. A few methodologies are being used in the art to integrate the multiple products.

The existing techniques involve custom integration to integrate with each market player that offers product based services. For integration with multiple vendors, a coder have to write code multiple times, and this is in addition to the detailed study required for each product. Further, the earlier frameworks were more about providing a platform/standard to the application developers using which they can integrate with different vendors one by one. These methods consume a lot of time and effort of the coders.

In addition to that there is no player that shapes according to the end user business model and provides services such as license management within the framework. There is no a common license management module which is managed by the integration layer. Managing the multiple licenses of various products is again a challenging task and requires effort and time. There is no well-defined platform or framework which can be used repeatedly without investing enough efforts and time.

SUMMARY

Embodiments of the present disclosure present technological improvements as solutions to one or more of the above-mentioned technical problems recognized by the inventors in conventional systems. For example, in one embodiment, a system for integrating a plurality of service providers across a plurality of domains with an application using a platform has been provided. The system comprising a registration module, an API interface, a memory and a processor. The registration module registers metadata corresponding to the plurality of service providers and their plurality of domains on the platform, metadata corresponding to a plurality of services provided by each of the registered service providers on the platform, and metadata corresponding to a set of parameters for each of the services for each of the registered service providers on the platform. The API interface provides the application for integration via the platform, wherein the application is having a wrapper protocol. The processor further comprises a metadata based request builder module, a response capturing module, a response standardization module and an integration module. The metadata based request builder module converts the wrapper protocol of the application into a format specific to one of the plurality of services, wherein the conversion is done based on the metadata registered for the service and the service provider corresponding to the application. The response capturing module captures a response from the plurality of service providers corresponding to the wrapper protocol. The response standardizing module converts the response from the plurality of service providers in to a standardized format defined by the wrapper protocol. The integration module integrates the standardized format with the format specific to the application in the platform.

In another aspect the embodiment here provides a method for integrating a plurality of service providers across a plurality of domains with an application using a platform. Initially, metadata corresponding to the plurality of service providers and their plurality of domains is registered on the platform. At the same time metadata corresponding to a plurality of services provided by each of the registered service providers registered on the platform, and metadata corresponding to a set of parameters for each of the services for each of the registered service providers is registered on the platform. In the next step, the application is provided for integration via the platform, wherein the application is having a wrapper protocol. In the next step, the wrapper protocol of the application is converted into a format specific to one of the plurality of services using a metadata based request builder module, wherein the conversion is done based on the metadata registered for the service and the service provider corresponding to the application. In the next step, a response is captured from the plurality of service providers corresponding to the wrapper protocol using a response capturing module. The captured response from the plurality of service providers is then converted in to a standardized format defined by the wrapper protocol using a response standardization module. And finally, the standardized format with the format specific to the application in the platform is integrated using an integration module.

In another embodiment, a non-transitory computer-readable medium having embodied thereon a computer program for integrating a plurality of service providers across a plurality of domains with an application using a platform. Initially, metadata corresponding to the plurality of service providers and their plurality of domains is registered on the platform. At the same time metadata corresponding to a plurality of services provided by each of the registered service providers registered on the platform, and metadata corresponding to a set of parameters for each of the services for each of the registered service providers is registered on the platform. In the next step, the application is provided for integration via the platform, wherein the application is having a wrapper protocol. In the next step, the wrapper protocol of the application is converted into a format specific to one of the plurality of services using a metadata based request builder module, wherein the conversion is done based on the metadata registered for the service and the service provider corresponding to the application. In the next step, a response is captured from the plurality of service providers corresponding to the wrapper protocol using a response capturing module. The captured response from the plurality of service providers is then converted in to a standardized format defined by the wrapper protocol using a response standardization module. And finally, the standardized format with the format specific to the application in the platform is integrated using an integration module.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Glossary—Terms Used in the Embodiments

The expression "plurality of service providers" or "service providers" or "vendors" in the context of the present disclosure refers to the one who provides a "plurality of services" or "products". Further, those services are being invoked through the present system.

The expression "domains" or "vendor types" in the context of the present disclosure refers to the sub-category of vendors, the field or domain in which their services are being offered. For example, "Browser based Video Conferencing" is one of the domain.

The expression "application" or "integrating application" or "web application" in the context of the present disclosure refers to an application which is going to be integrated with the existing plurality of services using the present protocol.

Figure 1:
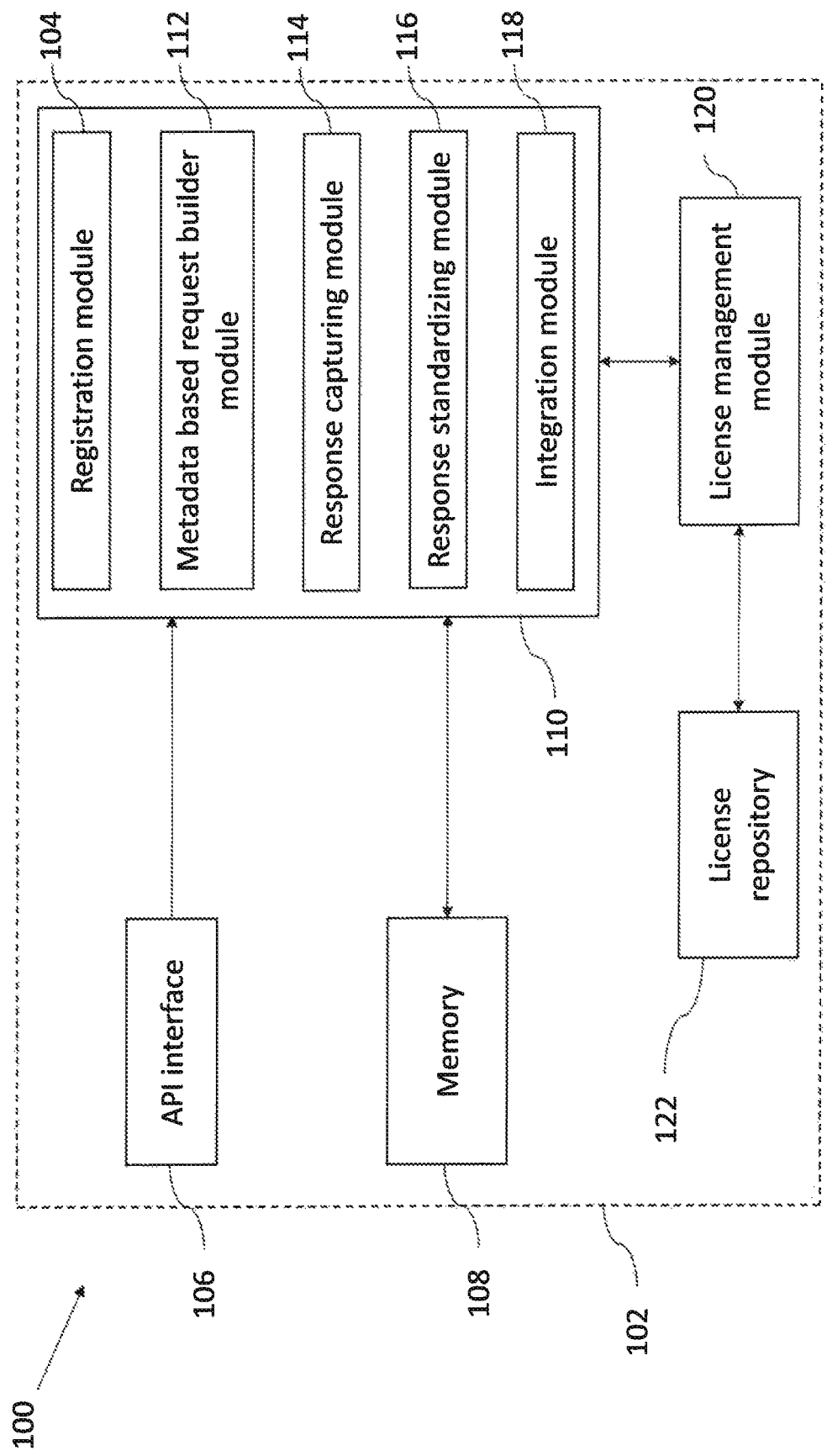
FIG. 1 illustrates a block diagram of a system for integrating a plurality of service providers across a plurality of domains using a platform according to an embodiment of the present disclosure.
Figure 2:
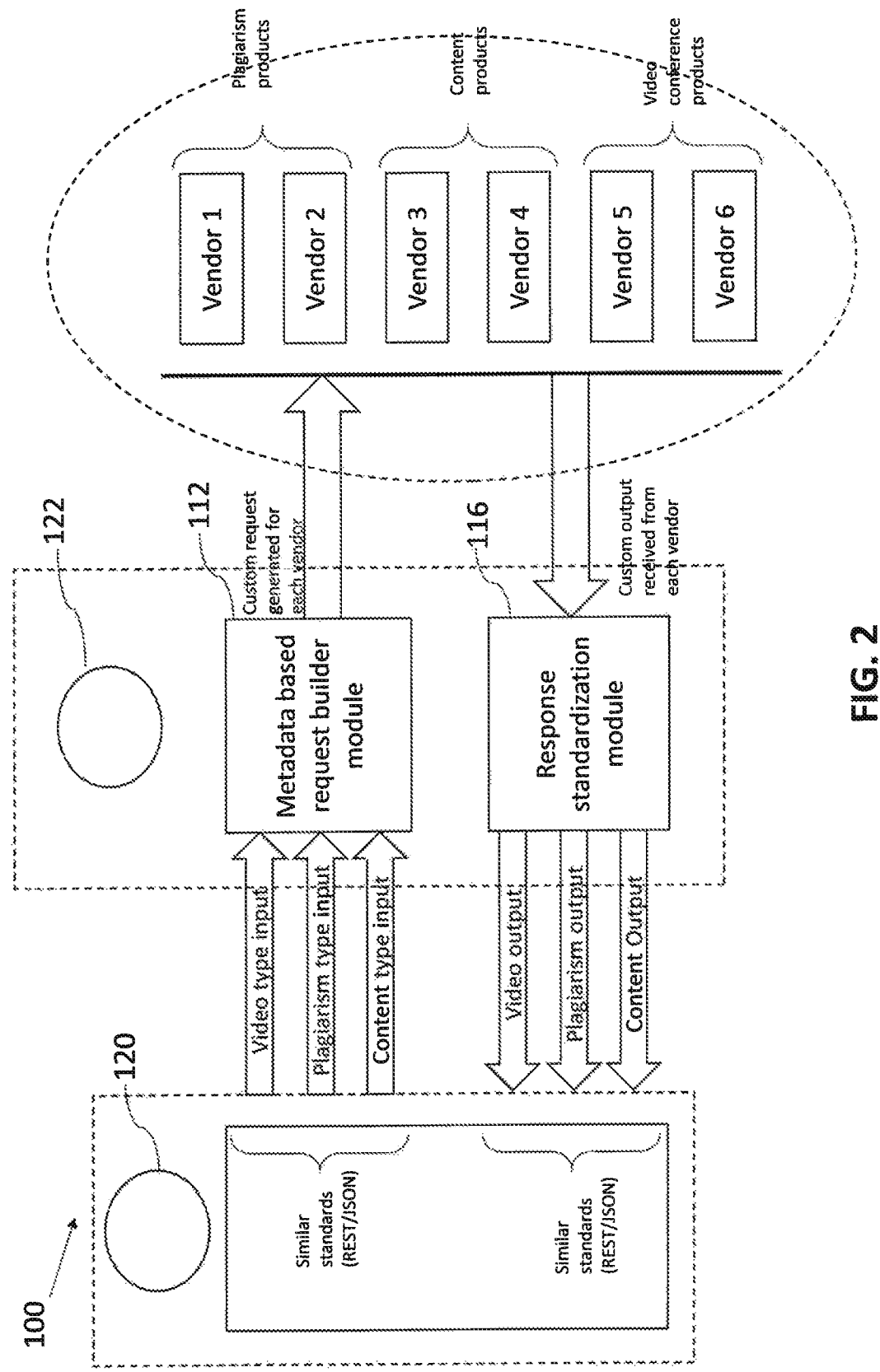
FIG. 2 shows a schematic architectural view of the system according to an embodiment of the disclosure.

Referring now to the drawings, and more particularly to FIG. 1 through FIG. 3, where similar reference characters denote corresponding features consistently throughout the figures, there are shown preferred embodiments and these embodiments are described in the context of the following exemplary system and/or method.

According to an embodiment of the disclosure, a system 100 for integrating a plurality of service providers across a plurality of domains with an application using a platform 102 is shown in FIG. 1. The platform 102 is provided by a platform owner. The platform can also be referred as the hosted platform in the present disclosure. The system 100 provides a metadata based approach to integrate the plurality of service providers using a common protocol. The common protocol saves custom integration effort with each of the plurality of service provides which offers the plurality of services in the supported domain. The system 100 is configured to standardize the integration approach across similar products (Video, Learning, Plagiarism detection etc.) by defining a wrapper protocol across similar products/services. In an example of the disclosure, the system 100 can also be referred as iON third party framework and protocol (iON TPFP). iON TPFP is a cloud based framework. The system 100 also involves the creation of a dynamic request and this protocol is extendable to any service provider.

According to an embodiment of the disclosure, the system 100 further comprises a registration module 104, an API interface 106, a memory 108 and a processor 110 as shown in the block diagram of FIG. 1. The processor 110 works in communication with the memory 108. The processor 110 further comprises a plurality of modules. The plurality of modules accesses the set of algorithms stored in the memory 108 to perform a specific task. The processor 110 further comprises a metadata based request builder module 112, a response capturing module 114, a response standardization module 116 and an integration module 118.

According to an embodiment of the disclosure, the registration module 104 is configured to register three types of metadata on the hosted platform 102. 1. Metadata corresponding to the plurality of service providers and their plurality of domains on the platform 102. 2. Metadata corresponding to a plurality of services provided by each of the registered service providers on the platform 102. This includes service components. 3. Metadata corresponding to a set of parameters for each of the services for each of the registered service providers on the platform 102. The system 100 is also configured to group the services, and standardized input and output for all the same type of services across products providing similar services. Any application integrating with the system 100 will get a host of ready to integrate products. This product repository will keep increasing as we expand.

According to an embodiment of the disclosure the application programming interface (API) interface 106 is configured to provide an input to the system 100. The API interface 106 is configured to provide the application for integration via the platform. The application is the integrating application. The integrating application can be built by anyone, can be built on any technology and can be built on any framework. Thus the system 100 is technology agnostic and framework agnostic. The API interface 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite.

According to an embodiment of the disclosure, the integrating application comprises the wrapper protocol. Such that the application interested in integration has a well-defined and repeatable standard to deal with. The wrapper protocol further comprises six predefined methods. These six predefined methods are a method for getting the types of the plurality of service providers, a method for getting the list of the plurality of service providers, a method for getting the list of the plurality of services, a method for posting the plurality of services, a method for getting URLs of the plurality of services, and a method for accessing the license repository. Each of the six predefined methods are available as HTTP REST URLs. In an example of the disclosure, the six predefined methods can also be referred as GetVendorTypes, GetVendorList, GetVendorServiceList, PostVendorService, GetVendorServiceURL and LicenseMgmt respectively. These methods have been explained in detail in the later part of this disclosure.

According to an embodiment of the disclosure, the processor 110 comprises the metadata based request builder module 112. The metadata based request builder module 112 is configured to convert the wrapper protocol of the application into a format specific to one of the plurality of services, wherein the conversion is done based on the metadata registered for the service and the service provider corresponding to the integrating application. The metadata based request builder module 112 takes input in the format of the wrapper protocol as key value pairs in JSON over REST.

According to an embodiment of the disclosure, the processor 110 further comprises the response capturing module 114 and the response standardization module 116. The response capturing module 114 is configured to capture a response from the plurality of service providers corresponding to the wrapper protocol. While the response standardization module 116 converts the captured response from the plurality of service providers in to a standardized format defined by the wrapper protocol. It should be appreciated that in another embodiment of the disclosure, the response standardization module 116 can also be configured to capture the response. Further, the integration module 118 integrates the standardized format with the format specific to the application in the platform 102. Thus, iTPFP will communicate to the plurality of service providers, for few number of type of transactions, and if the integrating applications follow the wrapper protocol, then the integrating application owner don't need to know the set of vendors in order to integrate with them. Hence instead of coding, the integrating application can seamlessly interact with a host of Service Providers According to an embodiment of the disclosure, the system 100 further includes a license management module 120. The license management module 120 is configured to manage the licenses and corresponding data of the plurality of service providers. The license management module 120 is configured to be accessed via one of the six predefined methods of the wrapper protocol. The license management module 120 also maintains a license repository 122 for storing the licenses of the plurality of service providers. The license repository 122 can have repository of key-value pairs (exposed on an API), where the end user can register multiple key values (like license code, registered mail, App Id etc.) against a vendor from the vendor list. Any license parameter (e.g., registered mail Id, application Id, Admin credentials etc.) can also be captured, and can be further used for passing to iON TPFP to drive integration with the third party product.

According to an embodiment of the disclosure, the system 100 significantly reduces the integration effort for the coders. The system 100 also provides a ready repository of the vendors which are already integrated with the platform 102. Hence in addition to reduction of effort, the integrating application gets a value add in terms of getting multiple Products readily integrated as well.

According to an embodiment of the disclosure, the system 100 can be explained with the help of a schematic architecture as shown in FIG. 2. The schematic in the FIG. 2 have been explained with help of three types of service providers, i.e., video conferencing vendors, plagiarism vendors, and content management vendors. There could be various other vendors which could be registered with the platform 102. All the applications which need to be integrated are provided on the left hand side. All the integrating application are also in communication with the license management module 120. The license management module 120 can provide all the necessary license information to the integrating applications. All the integrating applications are built over REST/JSON protocol. The integrating application can be provided as input to the metadata based request builder module 112. Depending on the type of the vendor, a custom request for each of the vendors. The custom request is sent to the repository the plurality of vendors. This repository has all the metadata of the registered plurality of service providers. A custom output is received from each of the vendors, which is then provided as input to the response standardization module 116. The response standardization module 116 is then provides the output in the standardized format which can be used for the integration of the integrating applications.

Figure 3A:
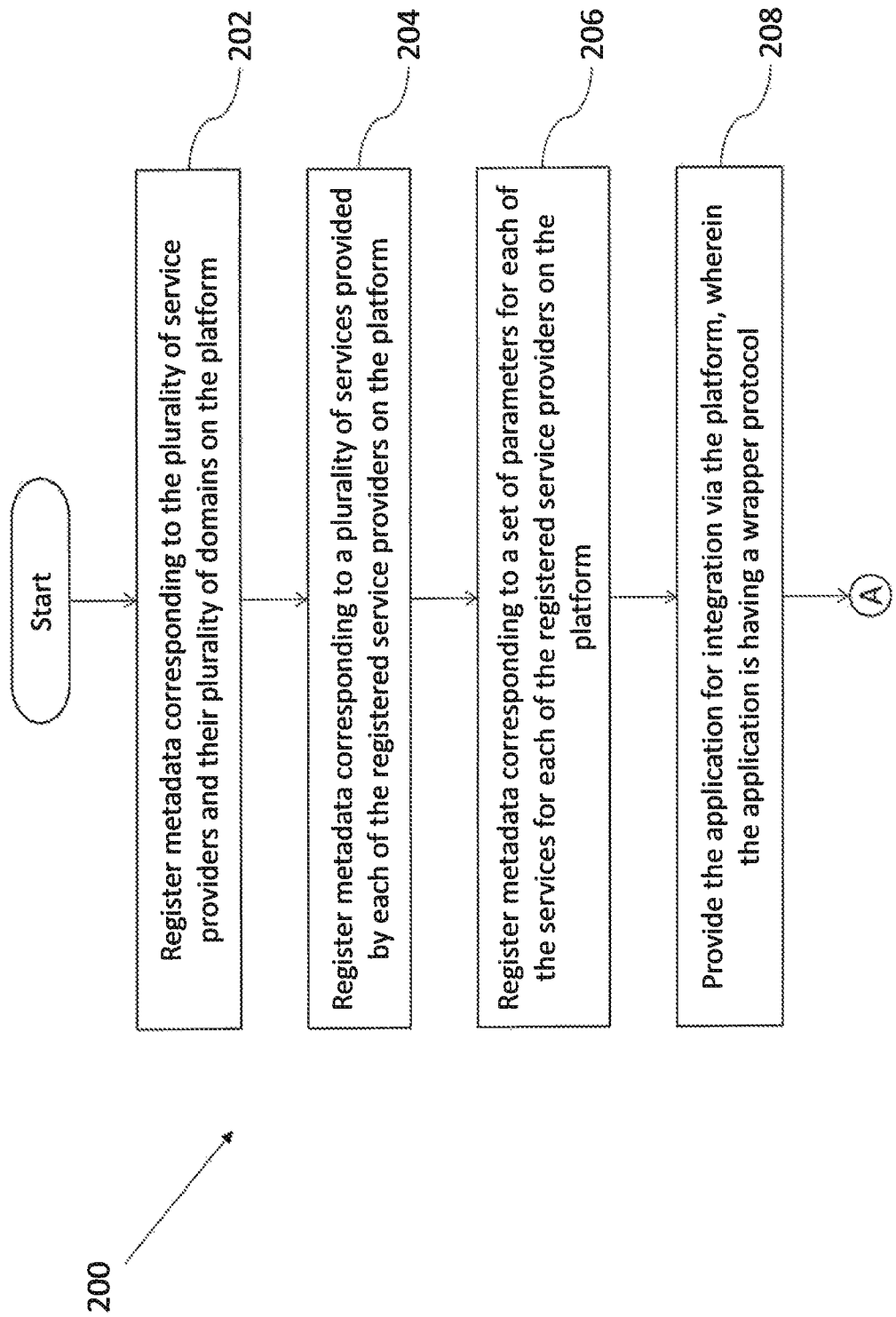
FIG. 3A-3B is a flowchart illustrating the steps involved in a protocol for integrating a plurality of service providers across a plurality of domains using a platform according to an embodiment of the present disclosure.
Figure 3B:
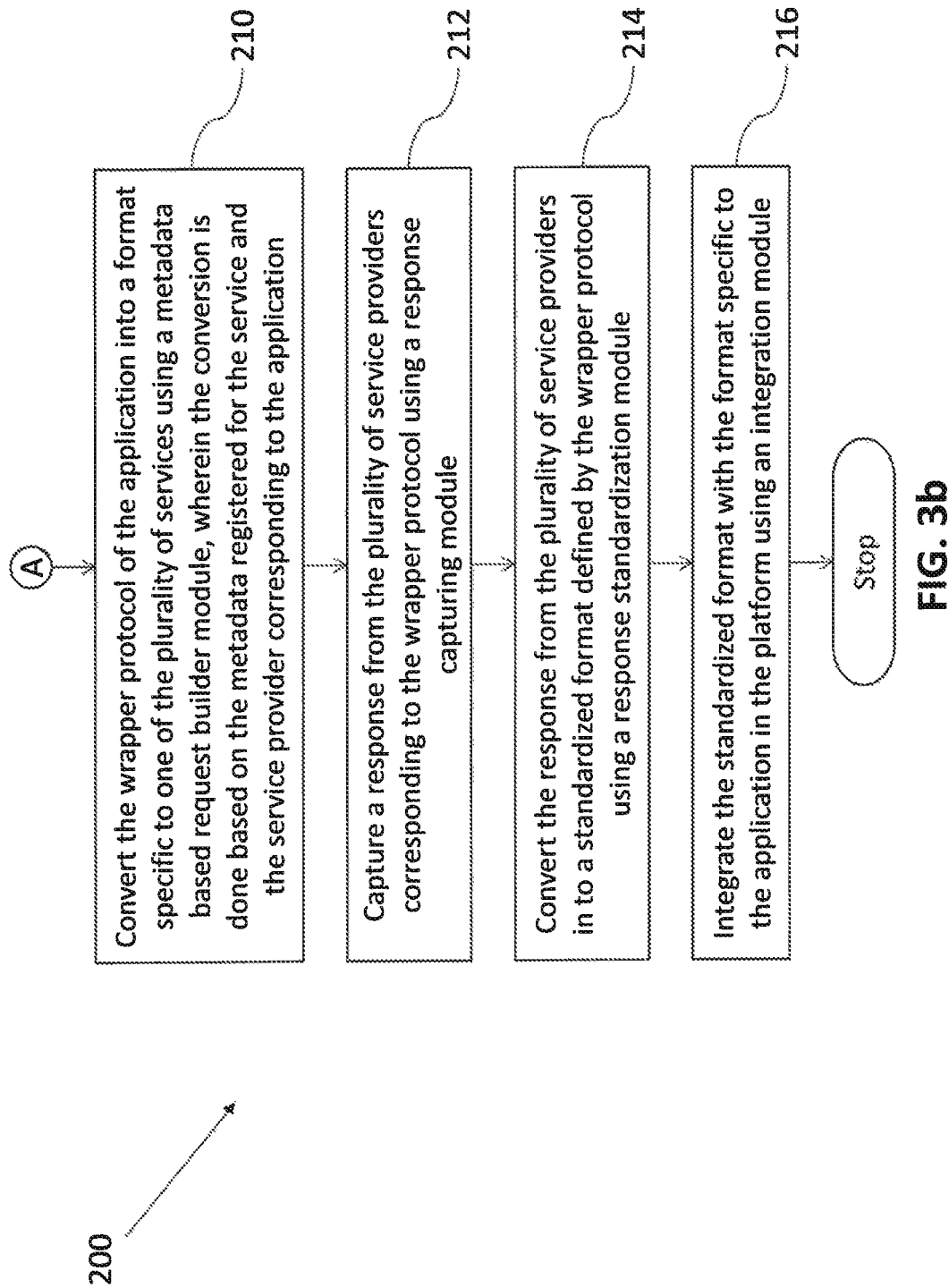

In operation, a flowchart 200 illustrating the steps of the protocol for integrating the plurality of service providers across the plurality of domains with the integrating application using the platform 102 as shown in FIG. 3A-3B. Initially at steps 202, metadata corresponding to the plurality of service providers and their plurality of domains is registered on the platform 102. Similarly at step 304, metadata corresponding to a plurality of services provided by each of the registered service providers is registered on the platform 102, and at step 206 metadata corresponding to a set of parameters for each of the services for each of the registered service providers is registered on the platform 102.

In the next step 208, the integrating application is provided for integration via the platform 102. The integrating application is having the wrapper protocol. The wrapper protocol include six predefined methods. Using the wrapper protocol, any application can communicate with the hosted platform 102, and the hosted platform 102 in turn can execute the request of the integrating application by internally connecting the plurality of service providers across the plurality of domains and provide the output in the standard format.

In the next step 210, the wrapper protocol of the application is converted into a format specific to one of the plurality of services using the metadata based request builder module 112. The conversion is done based on the metadata registered for the service and the service provider corresponding to the application. At step 212, the response from the plurality of service providers corresponding to the wrapper protocol is captured using the response capturing module 114. In the next step, the captured response from the plurality of service providers is converted in to a standardized format defined by the wrapper protocol using the response standardization module 116. And finally at step 214, the standardized format is integrated with the format specific to the application in the platform 102. Since the wrapper protocol defines/standardizes the mannerisms/format of communication (input & output), hence it reduces effort substantially at the end of the integrating application.

According to another embodiment of the disclosure, the system 100 or iTPFP can also be explained with the help of following example. In the present version of this disclosure, the iTPFP is currently supporting 20 types of services provides by the seven vendors across four domains. It should be appreciated that the disclosure have further scope for future expansion and development. The four domains include video conferencing, LMS content management, plagiarism and virtual labs. Table I shows the list of the plurality of services supported by the system 100.

TABLE I

| Domain of the Service Provider | Domain Code | Service Name | Service Description |
| --- | --- | --- | --- |
| Scanning content for Plagiarism from Web | Plagiarism | Authenticate | This service is used to create a session with your provider, and establish your identity. |
| Scanning content for Plagiarism from Web | Plagiarism | Text Scan | This service is used to place a request for scanning plain text |
| Scanning content for Plagiarism from Web | Plagiarism | File Scan | This service is used to place a request for scanning a File based document |
| Scanning content for Plagiarism from Web | Plagiarism | Image Scan | This service is used to place a request for scanning an Image file. |
| Scanning content for Plagiarism from Web | Plagiarism | Status | This service is used to check status of a previous request which has been placed |
| Scanning content for Plagiarism from Web | Plagiarism | Result | This service is used to fetch the result of a previous request which has been placed |
| LMS Content Providers | Content | Authenticate | This service is used to create a session with your provider, and establish your identity. |
| LMS Content Providers | Content | Get Courses | This service is used to fetch a list of Courses/Catalogues - Basically the entity which is read and completed by a learner |
| LMS Content Providers | Content | Enrollment | This service is used to register your learner Ids to a Course/Catalogue/Learning Entity |
| LMS Content Providers | Content | Launch URL | This service, returns the launch URL for a learning entity, which can be put in a browser/iframe to take the learner to that Entity on you service provider's platform. |
| LMS Content Providers | Content | Get Progress | This service is used to fetch the completion status of a learning entity for a learner |
| Browser based Video Conferencing | Conference | Authenticate | This service is used to create a session with your provider, and establish your identity. |
| Browser based Video Conferencing | Conference | Create Conference | This service is used to create/schedule a web conference on your vendor's platform. |
| Browser based Video Conferencing | Conference | Enrollment | This service is used to enroll users into a conference session that was created earlier. |
| Browser based Video Conferencing | Conference | Join Conference | This service is used to fetch a URL using which a conference can be launched |
| Browser based Video Conferencing | Conference | Pull Recording | This service is used to pull a recorded session of an earlier conference which was conducted by you |
| Virtual Lab for Programmers | Vlab | Authenticate | This service is used to create a session with your provider, and establish your identity. |
| Virtual Lab for Programmers | Vlab | Get Languages | This service used to fetch a list of languages, for which online code compilation is supported by your vendor |

TABLE I-continued

| Domain of the Service Provider | Domain Code | Service Name | Service Description |
|---|---|---|---|
| Virtual Lab for Programmers | Vlab | Send Submission | This service is used to push a piece of code for compilation to your vendor |
| Virtual Lab for Programmers | Vlab | Result | This service is used to fetch the result of a compilation. Contains program output and compilation errors |

Table II shows the list of the plurality of service providers supported by the system 100.

| Domain of Service Provider | Domain Code | Supported Vendor | Vendor Website |
|---|---|---|---|
| Scanning content for Plagiarism from Web | Plagiarism | Copyleaks | https://copyleaks.com/ |
| Scanning content for Plagiarism from Web | Plagiarism | Plagscan | https://www.plagscan.com |
| LMS Content Providers | Content | Moodle | https://moodle.com/cloud/ |
| LMS Content Providers | Content | EdX | https://www.edx.org/ |
| Browser based Video Conferencing | Conference | Vidyo | https://vidyo.io/ |
| Browser based Video Conferencing | Conference | Impartus | http://impartus.com/ |
| Virtual Lab for Programmers | Vlab | Sphere Engine | https://sphere-engine.com/ |

As explained above the wrapper protocol has six predefined methods. All the methods are available as HTTP REST URLs. All interactions are done over these 6 methods only. The inputs/outputs may vary in some cases (depending on the type of "Vendor Service" being invoked. Few of the methods are metadata based and are available publicly. While few of the methods are not metadata based need an iTPFP license, and need to be called from a registered domain. The six predefined methods are as follows:

GetVendorTypes (Metadata based): This method would provide, as a JSON output, a list of "Domains" which are supported in the current version of iTPFP GetVendorList (Metadata based): This method would provide, as a JSON output, a list of Vendors which are supported in the current version of iTPFP.

GetVendorServiceList (Metadata based): This method would provide, as a JSON output, a list of Vendor Services which are available for interaction with the particular vendor (The method needs vendor Id or Vendor Type Id as an input to work).

PostVendorService (Not Metadata based): This method accepts an input JSON (which varies on the type of vendor, the service of which is being invoked), and gives a standardized output JSON, after invoking the Service which has been passed as in input. This method does the actual task of invoking 3rd party vendor services via a standard input/output. The input/output formats for this method have been predefined for every service for every domain, which means (for example), that PostVendorService format for Scanning a Text File for any supported plagiarism vendor will be the same and is defined in the protocol specifications.

GetVendorServiceURL (Not Metadata based): This method accepts an input JSON (which varies on the type of vendor, the service of which is being invoked), and returns a fully formed URL, along with post parameters. This URL can be invoked directly by the integrating application to invoke the vendor service by directly connecting with the vendor, however, the output will not be standardized in this case.

LicenseMgmt: 1. Default (Metadata based): The "LicenseMgmt" method when called without any parameters, gives a list of vendors and the license parameters needed (for example secret key, password, registered email etc.) to authenticate with those vendors. 2. With iTPFP License (Not metadata based): This method, when invoked with iTPFP license information serves to fetch and store your license parameters.

For the sake of further description, a couple of the predefined methods of the protocol are provided as follows. The actual URLs, JSON inputs/outputs have been provided in an elaborate manner.

Method Specifications

GetVendorTypes (Metadata Based)

Description: Returns a list of "Domains" which are supported in the current version of iTPFP URL: GET www.tcsion.com/LX/iONThirdPartyFwNProtocol/GetVendorTypes URL Parameters: None Type: It is a service Open for Public Consumption and does not need any subscription Output: Format: JSON
Sample:
[{"vendor_concept_master_id":1, "name":"Plagiarism"},
{"vendor_concept_master_id":2, "name":"Content"},
{"vendor_concept_master_id":3, "name":"Conference"}]
Attributes:
1. vendor_concept_master_id—Unique identifier of a "Vendor Type"/"Domain"
2. name—Name of the Domain
PostVendor Service (Not Metadata Based)
Description: This method accepts an input JSON (which varies on the type of vendor, the service of which is being invoked), and gives a standardized output JSON, after invoking the Service which has been passed as in input
URL:POST
www.tcsion.com/LX/iONThirdPartyFwNProtocol/PostVendorService?service_id=x&org_id=y&license_code=z
URL Parameters:
service_id—Is the unique identifier of a type of service for a particular vendor (fetched via GetVendorServiceList method).
org_id—Unique identifier provided to Org of integrating application when it subscribes to iON (www.tcsion.com),
license_code—License provided to integrating application for using iTPFP, valid for a specific website domain only.
POST Parameters: A JSON is posted (in the post content) along with the URL. This JSON varies with each type of service, but is constant across vendors within a domain.
Type: It is a service offered by ION (www.tcsion.com) on a SAS model. Needs a subscription.

EXAMPLE 1

Image Scan for a Plagiarism Vendor

REST Parameters
<service_id>→Id of the service, of any supported plagiarism vendor, where service_name="Image Scan" (From method GetVendorServiceList of the same protocol)
<org_id> & <license_code>→iTPTP license parameters provided to integrating application.
JSON of Format (in POST)→{'Token': 'A valid authentication token', 'File': 'URL/Path of the File to be scanned'})
Output
{"Filename": "<Name of the submitted file>", "ProcessId": "<Identifier of the scanning process you have initiated>", "CreationTimeUTC": "<Timestamp>"}

EXAMPLE 2

Fetching Status of Your Submitted File to Any Plagiarism Vendor REST Parameters

<service_id>→Id of the service, of any supported plagiarism vendor, where service_name="Status" (From method Get VendorServiceList of the same protocol) <org_id> & <license_code>→iTPTP license, parameters provided to integrating, application.
JSON of Format (in POST)→{'Token': 'A valid authentication token'. 'processId'; '<Valid Process Id>'})
Output—
{'Status': '<Finished/In Progress>', 'ProgressPercents': <Integer between 1,100>}

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein provides a protocol for integrating a plurality of service providers from various domains with an application using the single platform. The protocol thus reduces the effort and time required to custom integrate each of the integrating application on the hosted platform.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:
1. A method for integrating a plurality of service providers across a plurality of domains with an integrating application using a common protocol via a hosted platform, the method comprising a processor implemented steps of:
registering metadata corresponding to the plurality of service providers and their plurality of domains on the hosted platform;
registering metadata corresponding to a plurality of services provided by each of the registered service providers on the hosted platform;

registering metadata corresponding to a set of parameters for each of the services for each of the registered service providers on the hosted platform;

providing the integrating application for standardizing integration of the plurality of services across similar domain via the hosted platform, wherein the integrating application is having a wrapper protocol defined for integration of the plurality of services across the similar domain;

converting the wrapper protocol of the integrating application into a format specific to the plurality of services pertaining to the similar domain, wherein the conversion is done based on the metadata registered for the service and the service provider corresponding to the integrating application, wherein for the conversion, an input is received by the processor in the format of the wrapper protocol as key value pairs in a JSON data-interchange format;

capturing a response as an input from the plurality of service providers corresponding to the wrapper protocol;

converting the response from the plurality of service providers across the similar domain into a standardized format defined by the wrapper protocol as a standardized output; and integrating the standardized format with the format specific to the integrating application in the hosted platform, wherein similar type of services are grouped and the wrapper protocol standardizes input and output of the similar type of services, wherein the wrapper protocol comprising predefined methods for performing interactions with the service providers for invoking the services, wherein the input and output formats for the predefined methods have been predefined for every service for every domain, wherein the wrapper protocol automatically communicates with the plurality of service providers for performing one or more transactions to seamlessly integrate the plurality of service providers with the integrating application without need of coding, wherein the wrapper protocol comprising six predefined methods for performing interactions with the service providers for invoking the services, wherein the six predefined methods comprising:

a method for obtaining types of the plurality of service providers, a method for obtaining a list of the plurality of service providers, a method for obtaining a list of the plurality of services, a method for posting the plurality of services, a method for obtaining URLs of the plurality of services, and a method for accessing a license repository.

2. The method of claim 1 further comprising the step of managing the license data for the plurality of service providers by the hosted platform.

3. The method of claim 1 further comprising the step of maintaining a license repository of licenses of the plurality of service providers on the hosted platform.

4. The method of claim 1, wherein the wrapper protocol is made over a representational state transfer (REST) protocol.

5. The method of claim 1, wherein the plurality of domains comprise a video conferencing, a plagiarism, a learning management system content and a virtual lab.

6. The method of claim 1, wherein the hosted platform is built on single sign-on (SSO) logic for the plurality of service providers wherever applicable.

7. The method of claim 1, wherein the hosted platform is hosted by a platform provider.

8. A system for integrating a plurality of service providers across a plurality of domains with an integrating application using a common protocol via a hosted platform, the system comprising:

a memory; and a processor in communication with the memory, wherein the processor further comprising:

a registration module coupled to the processor to register:

metadata corresponding to the plurality of service providers and their plurality of domains on the hosted platform;

metadata corresponding to a plurality of services provided by each of the registered service providers on the hosted platform; and metadata corresponding to a set of parameters for each of the services for each of the registered service providers on the hosted platform;

an API interface coupled to the processor for providing the integrating application for standardizing integration of the plurality of services across similar domain via the hosted platform, wherein the integrating application is having a wrapper protocol defined for integration of the plurality of services across the similar domain;

a metadata based request builder module coupled to the processor for converting the wrapper protocol of the integrating application into a format specific to the plurality of services pertaining to the similar domain, wherein the conversion is done based on the metadata registered for the service and the service provider corresponding to the integrating application, wherein for the conversion, an input is received by the processor in the format of the wrapper protocol as key value pairs in a JSON data-interchange format;

a response capturing module coupled to the processor for capturing a response as an input from the plurality of service providers corresponding to the wrapper protocol;

a response standardizing module coupled to the processor for converting the response from the plurality of service providers across the similar domain into a standardized format defined by the wrapper protocol as a standardized output; and an integration module coupled to the processor for integrating the standardized format with the format specific to the integrating application in the hosted platform, wherein similar type of services are grouped and the wrapper protocol standardizes input and output of the similar type of services, wherein the wrapper protocol comprising predefined methods for performing interactions with the service providers for invoking the services, wherein the input and output formats for the predefined methods have been predefined for every service for every domain, wherein the wrapper protocol automatically communicates with the plurality of service providers for performing one or more transactions to seamlessly integrate the plurality of service providers with the integrating application without need of coding, wherein the wrapper protocol comprising six predefined methods for performing interactions with the service providers for invoking the services, wherein the six predefined methods comprising:

a method for obtaining types of the plurality of service providers,
a method for obtaining a list of the plurality of service providers,
a method for obtaining a list of the plurality of services,
a method for posting the plurality of services,
a method for obtaining URLs of the plurality of services, and
a method for accessing a license repository.

9. The system of claim 8 further comprising a license management module coupled to the processor for managing the licenses of the plurality of service providers, wherein the license management module coupled to the processor is to be accessed via one of the six predefined methods of the wrapper protocol.

10. The system of claim 8 further comprising a license repository for storing the licenses of the plurality of service providers.

11. A non-transitory computer-readable medium having embodied thereon a computer program when executed by a processor performs a method for integrating a plurality of service providers across a plurality of domains with an integrating application using a common protocol via a hosted platform, the method comprising a processor implemented steps of:
registering metadata corresponding to the plurality of service providers and their plurality of domains on the hosted platform;
registering metadata corresponding to a plurality of services provided by each of the registered service providers on the hosted platform;
registering metadata corresponding to a set of parameters for each of the services for each of the registered service providers on the hosted platform;
providing the integrating application for standardizing integration of the plurality of services across similar domain via the hosted platform, wherein the integrating application is having a wrapper protocol defined for integration of the plurality of services across the similar domain;
converting the wrapper protocol of the integrating application into a format specific to the plurality of services pertaining to the similar domain using a metadata based request builder module, wherein the conversion is done based on the metadata registered for the service and the service provider corresponding to the integrating application, wherein for the conversion, an input is received by the processor in the format of the wrapper protocol as key value pairs in a JSON data-interchange format;
capturing a response as an input from the plurality of service providers corresponding to the wrapper protocol using a response capturing module;
converting the response from the plurality of service providers across the similar domain into a standardized format defined by the wrapper protocol as a standardized output using a response standardization module; and
integrating the standardized format with the format specific to the integrating application in the hosted platform using an integration module, wherein similar type of services are grouped and the wrapper protocol standardizes input and output of the similar type of services, wherein the wrapper protocol comprising predefined methods for performing interactions with the service providers for invoking the services, wherein the input and output formats for the predefined methods have been predefined for every service for every domain, wherein the wrapper protocol automatically communicates with the plurality of service providers for performing one or more transactions to seamlessly integrate the plurality of service providers with the integrating application without need of coding, wherein the wrapper protocol comprising six predefined methods for performing interactions with the service providers for invoking the services, wherein the six predefined methods comprising:
a method for obtaining types of the plurality of service providers,
a method for obtaining a list of the plurality of service providers,
a method for obtaining a list of the plurality of services,
a method for posting the plurality of services,
a method for obtaining URLs of the plurality of services, and
a method for accessing a license repository.

* * * * *